(12) United States Patent
Shinchi et al.

(10) Patent No.: US 12,698,830 B2
(45) Date of Patent: Aug. 4, 2026

(54) GASKET AND SEALING STRUCTURE

(71) Applicant: NOK CORPORATION, Tokyo (JP)

(72) Inventors: Yusei Shinchi, Aso (JP); Noriaki Sato, Aso (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/840,650

(22) PCT Filed: Apr. 25, 2023

(86) PCT No.: PCT/JP2023/016250
§ 371 (c)(1),
(2) Date: Aug. 22, 2024

(87) PCT Pub. No.: WO2023/210627
PCT Pub. Date: Nov. 2, 2023

(65) Prior Publication Data
US 2025/0180118 A1      Jun. 5, 2025

(30) Foreign Application Priority Data

Apr. 28, 2022    (JP) ................................ 2022-074738

(51) Int. Cl.
*F16J 15/06*          (2006.01)
*F16J 15/10*          (2006.01)
(52) U.S. Cl.
CPC ........... *F16J 15/062* (2013.01); *F16J 15/104* (2013.01)
(58) Field of Classification Search
CPC ......... F16J 15/104; F16J 15/062; F16J 15/106
See application file for complete search history.

(56) References Cited

U.S. PATENT DOCUMENTS 3,215,441 A  *  11/1965  Horvere ................... F16J 15/32
                                                           277/467
3,472,523 A       10/1969  Rentschler et al.
                           (Continued)

FOREIGN PATENT DOCUMENTS

CN          203756986 U       8/2014
DE           1750946 A1      11/1971
                   (Continued)

OTHER PUBLICATIONS

International Search Report of the International Searching Authority, issued in PCT/JP2023/016250, mailed Jul. 4, 2023; ISA/JP (5 pages).

(Continued)

*Primary Examiner* — Eugene G Byrd
(74) *Attorney, Agent, or Firm* — Harness, Dickey & Pierce, P.L.C.

(57)                ABSTRACT

An annular gasket made of elastomer contacts with an inner peripheral surface of a hole in an outer member and an outer peripheral surface of an inner member to shut off an inner space of the outer member from an atmospheric space. The gasket includes a first wider portion, a second wider portion, a third wider portion, a first narrower portion, and a second narrower portion. The maximum distance between a first outer peripheral groove and the inner peripheral surface of the hole, the maximum distance between a second outer peripheral groove and the inner peripheral surface of the hole, the maximum distance between a first inner peripheral groove and the outer peripheral surface of the inner member, and the maximum distance between a second inner peripheral groove and the outer peripheral surface of the inner member are each at least 0.05 mm in a compressed state of the gasket.

13 Claims, 12 Drawing Sheets

(56)  References Cited

U.S. PATENT DOCUMENTS

| | | | | | |
|---|---|---|---|---|---|
| 4,693,343 | A | * | 9/1987 | Boyd ....................... | F16J 15/32 |
| | | | | | 267/129 |
| 6,179,297 | B1 | * | 1/2001 | Bauman ................... | F16J 15/56 |
| | | | | | 277/568 |
| 7,857,322 | B2 | * | 12/2010 | Fietz .................... | F16J 15/3268 |
| | | | | | 277/649 |
| 9,077,010 | B2 | | 7/2015 | Ueda et al. | |
| D788,912 | S | * | 6/2017 | Ishida ......................... | D24/130 |
| 10,232,120 | B2 | * | 3/2019 | Minagawa ............... | F16J 1/003 |
| 2016/0033042 | A1 | | 2/2016 | Minagawa | |
| 2016/0201830 | A1 | * | 7/2016 | Le Quere ............. | F16J 15/3236 |
| | | | | | 285/349 |
| 2020/0263791 | A1 | | 8/2020 | Whitehead et al. | |
| 2022/0136606 | A1 | * | 5/2022 | Morello ............. | H01R 13/5202 |
| | | | | | 277/370 |

FOREIGN PATENT DOCUMENTS

| | | | | | |
|---|---|---|---|---|---|
| EP | 2980458 | A1 | 2/2016 | | |
| JP | 2001-152472 | A | 6/2001 | | |
| JP | 2002-340191 | A | 11/2002 | | |
| JP | 47-37981 | B2 | 8/2011 | | |
| JP | 2015-004394 | A | 1/2015 | | |
| JP | 2016-33401 | A | 3/2016 | | |
| JP | 2016-038076 | A | 3/2016 | | |
| JP | 2018-003996 | A | 1/2018 | | |
| JP | 2018173089 | A | * | 11/2018 | ........... F16J 15/3236 |
| WO | 2016-040569 | A1 | 3/2016 | | |

OTHER PUBLICATIONS

Extended European Search Report for corresponding European Patent Application No. 23796367.3 dated May 4, 2026 (10 Pages).

* cited by examiner

GASKET AND SEALING STRUCTURE

CROSS REFERENCE TO RELATED APPLICATIONS

This application is a 371 U.S. National Phase of International Application No. PCT/JP2023/016250, filed on Apr. 25, 2023, which claims priority to Japanese Patent Application No. 2022-074738, filed Apr. 28, 2022. The entire disclosures of the above applications are incorporated herein by reference.

FIELD

The present disclosure relates to a gasket and a sealing structure.

BACKGROUND

A gasket sealing a gap between two members is known as disclosed in Japanese Patent Application Laid-Open Publication No. 2016-038076 and Japanese Patent Application Laid-Open Publication No. 2015-4394, for example.

TECHNICAL PROBLEM

The gasket is used in a water-abundant environment containing an aqueous solution of sodium chloride, calcium chloride, or the like. Even when the gasket is attached to a member made of aluminum, it is desired to prevent the member from being corroded by water in the water-abundant environment.

An object of the present disclosure is to provide a gasket and a sealing structure that can suppress corrosion of a gasket-attached member and that can extend a life of the member.

SUMMARY

A first aspect of the present disclosure provides an annular gasket made of elastomer and contacting with an inner peripheral surface of a hole in an outer member and an outer peripheral surface of an inner member to shut off an inner space of the outer member from an atmospheric space, the gasket including:

a first wider portion including a first larger-diameter outer peripheral surface having a cylindrical shape and contacting with the inner peripheral surface of the hole over a length equal to or larger than 0.1 mm in an axial direction of the gasket, a first smaller-diameter inner peripheral surface having a cylindrical shape and contacting with the outer peripheral surface of the inner member over a length equal to or larger than 0.1 mm in the axial direction of the gasket, a first end surface, a first outer corner formed by the first larger-diameter outer peripheral surface and the first end surface and having a curvature radius equal to or smaller than 0.5 mm in a section including an axis of the gasket, and a first inner corner formed by the first smaller-diameter inner peripheral surface and the first end surface and having a curvature radius equal to or smaller than 0.5 mm in the section including the axis of the gasket;

a second wider portion including a second larger-diameter outer peripheral surface having a cylindrical shape and contacting with the inner peripheral surface of the hole over a length equal to or larger than 0.1 mm in the axial direction of the gasket, a second smaller-diameter inner peripheral surface having a cylindrical shape and contacting with the outer peripheral surface of the inner member over a length equal to or larger than 0.1 mm in the axial direction of the gasket, a second end surface, a second outer corner formed by the second larger-diameter outer peripheral surface and the second end surface and having a curvature radius equal to or smaller than 0.5 mm in the section including the axis of the gasket, and a second inner corner formed by the second smaller-diameter inner peripheral surface and the second end surface and having a curvature radius equal to or smaller than 0.5 mm in the section including the axis of the gasket;

a third wider portion including a third larger-diameter outer peripheral surface contacting with the inner peripheral surface of the hole and having an interference equal to or larger than 0.05 mm with respect to the inner peripheral surface of the hole, and a third smaller-diameter inner peripheral surface contacting with the outer peripheral surface of the inner member and having an interference equal to or larger than 0.05 mm with respect to the outer peripheral surface of the inner member;

a first narrower portion provided between the first wider portion and the third wider portion, the first narrower portion including a first smaller-diameter outer peripheral surface spaced from the inner peripheral surface of the hole and including a first outer peripheral groove, and a first larger-diameter inner peripheral surface spaced from the outer peripheral surface of the inner member and having a first inner peripheral groove; and a second narrower portion provided between the second wider portion and the third wider portion, the second narrower portion including a second smaller-diameter outer peripheral surface spaced from the inner peripheral surface of the hole and including a second outer peripheral groove, and a second larger-diameter inner peripheral surface spaced from the outer peripheral surface of the inner member and including a second inner peripheral groove, wherein a maximum distance between the first outer peripheral groove and the inner peripheral surface of the hole, a maximum distance between the second outer peripheral groove and the inner peripheral surface of the hole, a maximum distance between the first inner peripheral groove and the outer peripheral surface of the inner member, and a maximum distance between the second inner peripheral groove and the outer peripheral surface of the inner member are each equal to or larger than 0.05 mm in a state where the gasket is compressed between the outer member and the inner member.

A second aspect of the present disclosure provides an annular gasket made of elastomer and contacting with an inner peripheral surface of a hole in an outer member and an outer peripheral surface of an inner member to shut off an inner space of the outer member from an atmospheric space, the gasket including:

a first wider portion including
    a first larger-diameter outer peripheral surface having a cylindrical shape, and
    a first smaller-diameter inner peripheral surface having a cylindrical shape;
  a second wider portion including
    a second larger-diameter outer peripheral surface having a cylindrical shape, and
    a second smaller-diameter inner peripheral surface having a cylindrical shape;
  a third wider portion including
    a third larger-diameter outer peripheral surface that has a diameter larger than a diameter of each of the first larger-diameter outer peripheral surface and the second larger-diameter outer peripheral surface when the gasket is not compressed between the outer member and the inner member, and
    a third smaller-diameter inner peripheral surface that has a diameter smaller than a diameter of each of the first smaller-diameter inner peripheral surface and the second smaller-diameter inner peripheral surface when the gasket is not compressed between the outer member and the inner member;
  a first narrower portion provided between the first wider portion and the third wider portion, the first narrower portion including
    a first smaller-diameter outer peripheral surface including a first outer peripheral groove, and
    a first larger-diameter inner peripheral surface including a first inner peripheral groove;
  a second narrower portion provided between the second wider portion and the third wider portion, the second narrower portion including
    a second smaller-diameter outer peripheral surface including a second outer peripheral groove, and
    a second larger-diameter inner peripheral surface including a second inner peripheral groove, wherein
  a length of a cylindrical part of the first larger-diameter outer peripheral surface, a length of a cylindrical part of the first smaller-diameter inner peripheral surface, a length of a cylindrical part of the second larger-diameter outer peripheral surface, and a length of a cylindrical part of the second smaller-diameter inner peripheral surface are each larger than each of a length of a cylindrical part of the third larger-diameter outer peripheral surface and a length of a cylindrical part of the third smaller-diameter inner peripheral surface, in an axial direction of the gasket.

A third aspect of the present disclosure provides a sealing structure including:
  the gasket;
  the outer member; and
  the inner member.

DETAILED DESCRIPTION

Figure 1:
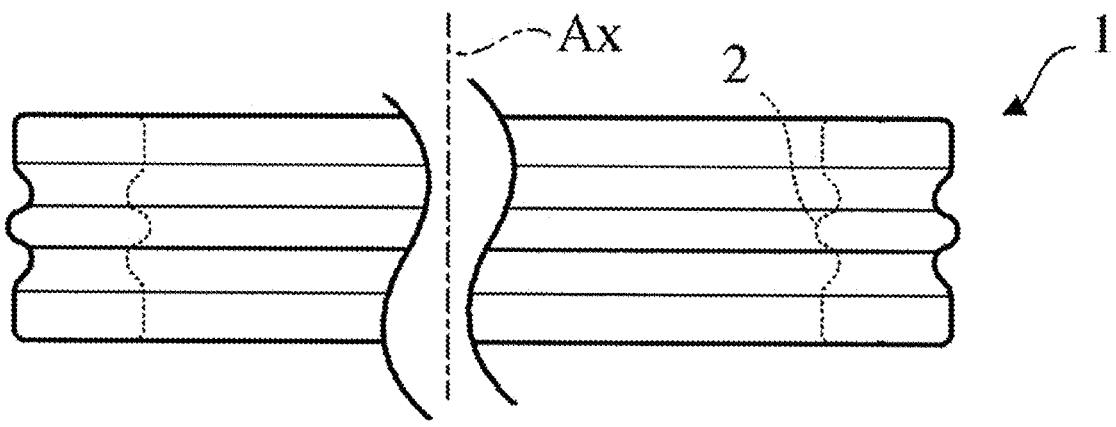
FIG. 1 is a front view of a gasket according to an embodiment.

The following describes various embodiments of the present disclosure with reference to the accompanying drawings. Reduction scales of the drawings are not necessarily precise, and some features are emphasized or omitted in the drawings in some cases.

As illustrated in FIG. 1, a gasket 1 according to the present embodiment has an annular shape that includes a through hole 2 inside. The gasket 1 has a shape rotationally symmetric around the center axis Ax.

Figure 2:
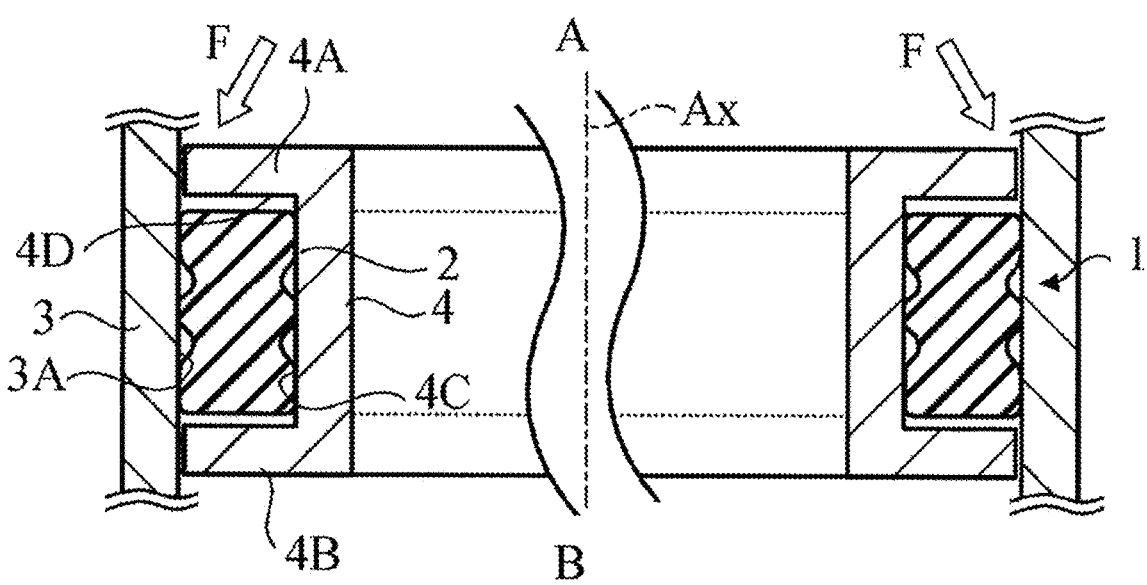
FIG. 2 is a sectional view of a sealing structure including the gasket according to the embodiment.

As illustrated in FIG. 2, the gasket 1 is arranged between an outer member 3 and an inner member 4. The gasket 1 contacts with an inner peripheral surface 3A of a hole in the outer member 3 and an outer peripheral surface 4C of the inner member 4. The gasket 1 shuts off an inner space B of the outer member 3 from an atmospheric space A.

The outer member 3 is, for example. a housing of a machine or structure. The inner member 4 is a tube, for example. The outer member 3 and the inner member 4 are each made of metal (e.g., aluminum).

The inner member 4 includes a larger-diameter portion 4A on a side of an atmospheric space A. The inner member 4 includes a larger-diameter portion 4B on a side of the inner space B. The inner member 4 includes a peripheral groove 4D between the larger-diameter portions 4A and 4B. The gasket 1 is arranged at the peripheral groove 4D.

The larger-diameter portion 4A and the larger-diameter portion 4B may be flanges.

The larger-diameter portion 4A, the larger-diameter portion 4B, and the peripheral groove 4D may be omitted.

The gasket 1 is used in a water-abundant environment as the atmospheric space A containing an aqueous solution of sodium chloride, calcium chloride, or the like. For this reason, the gasket 1 has a role of preventing or reducing intrusion of a foreign matter from the atmospheric space A to the inner space B. The foreign matter is particularly water. For example, the foreign matter such as water moves toward the gasket 1 through a gap between the larger-diameter portion 4A of the inner member 4 and the inner peripheral surface 3A of the hole in the outer member 3, as indicated by the arrows F.

The gasket 1 is formed of general elastomer (which encompasses rubber). The gasket 1 is formed of ethylene-propylene-diene monomer (EPDM) rubber, acrylic rubber, nitrile rubber, or fluororubber, for example. The gasket 1 is preferably formed of elastomer whose water resistance or chlorine resistance is high. The elastomer whose water resistance or chloride resistance is high is preferably EPDM rubber or fluororubber, for example.

Figure 3:
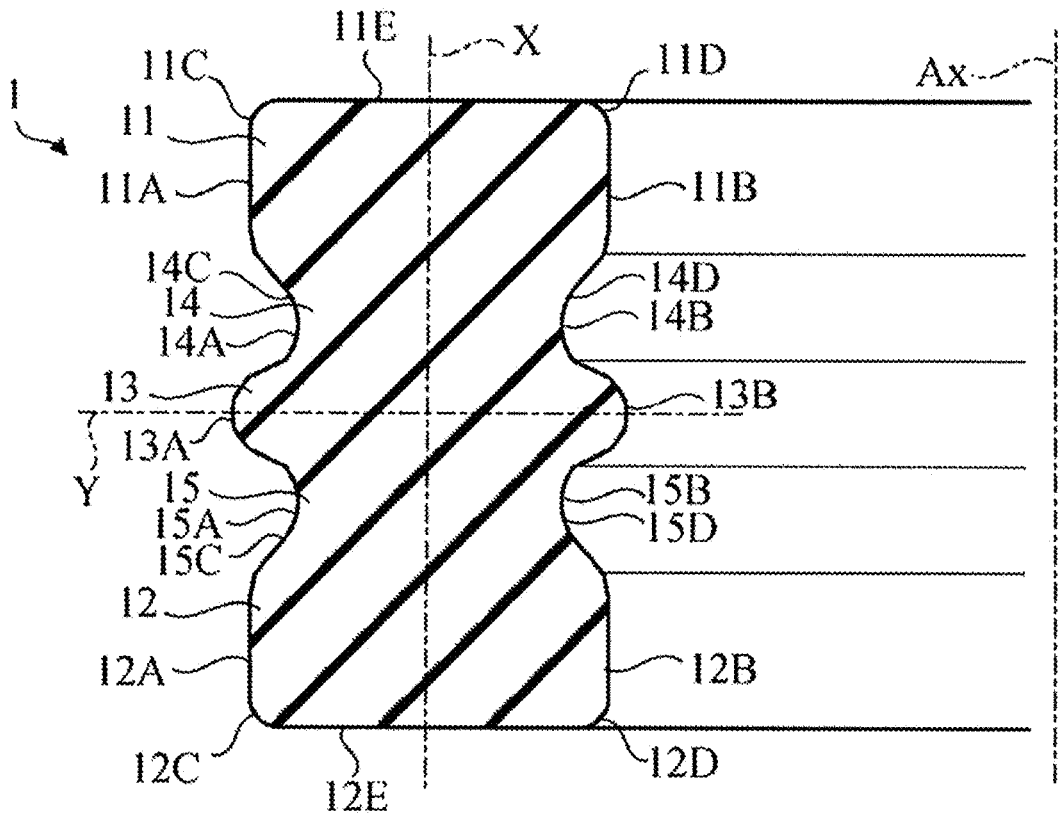
FIG. 3 is an enlarged sectional view of the gasket according to the embodiment.

FIG. 3 is an enlarged sectional view of the gasket 1 in a section including the center axis Ax, in an unused state where the gasket 1 is not compressed between the outer member 3 and the inner member 4. As illustrated in FIG. 3, the gasket 1 includes a first wider portion 11, a second wider portion 12, a third wider portion 13, a first narrower portion 14, and a second narrower portion 15.

The first wider portion 11 is located at a first end portion of the gasket 1 in the axial direction. The first wider portion 11 includes a first larger-diameter outer peripheral surface 11A having a cylindrical shape, a first smaller-diameter inner peripheral surface 11B having a cylindrical shape, and a first end surface 11E. The term "axial direction" refers to the direction of the center axis Ax. The first end surface 11E is an end surface of the gasket 1 in the axial direction. The first end surface 11E is flat. The first wider portion 11 includes an outer corner 11C (first outer corner) and an inner corner 11D (first inner corner). The outer corner 11C is formed by the first larger-diameter outer peripheral surface 11A and the first end surface 11E. The inner corner 11D is formed by the first smaller-diameter inner peripheral surface 11B and the first end surface 11E.

The second wider portion 12 is located at a second end portion of the gasket 1 in the axial direction. The second wider portion 12 includes a second larger-diameter outer peripheral surface 12A having a cylindrical shape, a second smaller-diameter inner peripheral surface 12B having a cylindrical shape, and a second end surface 12E. The second end surface 12E is an end surface of the gasket 1 in the axial direction. The second end surface 12E is flat. The second wider portion 12 includes an outer corner 12C (second outer corner) and an inner corner 12D (second inner corner). The outer corner 12C is formed by the second larger-diameter outer peripheral surface 12A and the second end surface 12E. The inner corner 12D is formed by the second smaller-diameter inner peripheral surface 12B and the second end surface 12E.

The third wider portion 13 is located at a center portion of the gasket 1 in the axial direction. The third wider portion 13 includes a third larger-diameter outer peripheral surface 13A and a third smaller-diameter inner peripheral surface 13B. As illustrated in FIG. 3, the third larger-diameter outer peripheral surface 13A has a semicircular shape protruding outward in a radial direction, in the section including the center axis Ax, in a state where the third wider portion 13 is not compressed between the outer member 3 and the inner member 4. The third smaller-diameter inner peripheral surface 13B has a semicircular shape protruding inward in the radial direction, in the section including the center axis Ax.

The first narrower portion 14 is provided between the first wider portion 11 and the third wider portion 13. The first narrower portion 14 includes a first smaller-diameter outer peripheral surface 14A and a first larger-diameter inner peripheral surface 14B. The first smaller-diameter outer peripheral surface 14A includes a first outer peripheral groove 14C. The first larger-diameter inner peripheral surface 14B includes a first inner peripheral groove 14D.

The first outer peripheral groove 14C includes a substantially semicircular part and an inclined part in the section including the center axis Ax. The substantially semicircular part is smoothly connected to the third larger-diameter outer peripheral surface 13A. The substantially semicircular part is concave inward in the radial direction. The inclined part is smoothly connected to the first larger-diameter outer peripheral surface 11A.

The first inner peripheral groove 14D includes a substantially semicircular part and an inclined part in the section including the center axis Ax. The substantially semicircular part is smoothly connected to the third smaller-diameter inner peripheral surface 13B. The substantially semicircular part is concave outward in the radial direction. The inclined part is smoothly connected to the first smaller-diameter inner peripheral surface 11B.

The second narrower portion 15 is provided between the second wider portion 12 and the third wider portion 13. The second narrower portion 15 includes a second smaller-diameter outer peripheral surface 15A and a second larger-diameter inner peripheral surface 15B. The second smaller-diameter outer peripheral surface 15A includes a second outer peripheral groove 15C. The second larger-diameter inner peripheral surface 15B includes a second inner peripheral groove 15D.

The second outer peripheral groove 15C includes a substantially semicircular part and an inclined part in the section including the center axis Ax. The substantially semicircular part is smoothly connected to the third larger-diameter outer peripheral surface 13A. The inclined part is smoothly connected to the second larger-diameter outer peripheral surface 12A.

The second inner peripheral groove 15D includes a substantially semicircular part and an inclined part in the section including the center axis Ax. The substantially semicircular part is smoothly connected to the third smaller-diameter inner peripheral surface 13B. The inclined part is smoothly connected to the second smaller-diameter inner peripheral surface 12B.

Preferably, a shape (a sectional shape in FIG. 3) of the gasket 1 in the section including the center axis Ax is line-symmetrical with respect to the vertical axis X of the section. Preferably, the shape (the sectional shape in FIG. 3) of the gasket 1 in the section including the center axis Ax is also line-symmetrical with respect to the lateral axis Y of the section. Accordingly, the gasket 1 has a shape that is mirror-symmetric with respect to a plane (a plane including the lateral axis Y) perpendicular to the center axis Ax.

Figure 4:
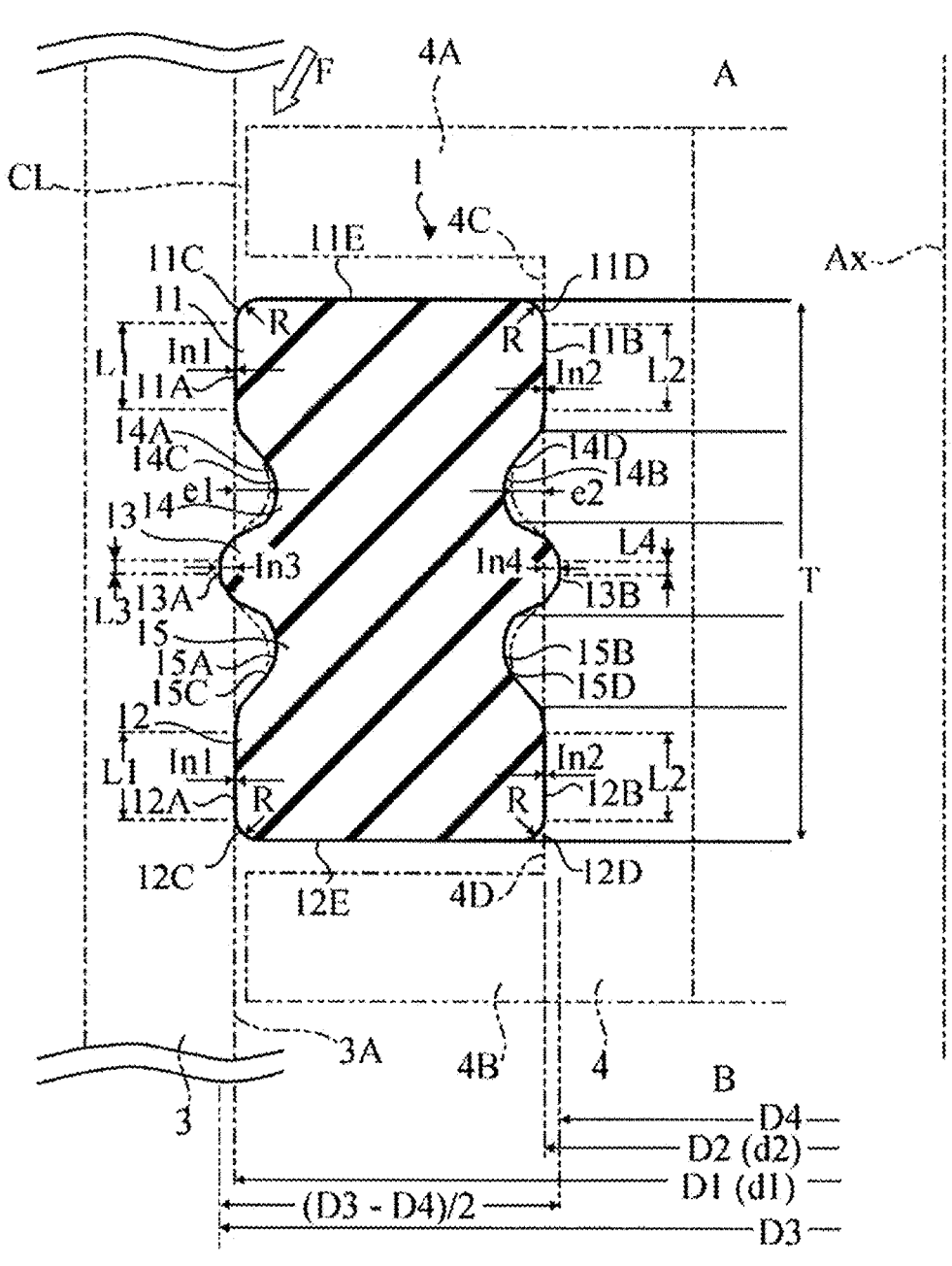
FIG. 4 is an enlarged sectional view of the gasket according to the embodiment and depicts an outer member and an inner member by the imaginary lines.

Thus, as illustrated in FIG. 4, an effect when the first wider portion 11 is arranged on a side of the atmospheric space A and the second wider portion 12 is arranged on a side of the inner space B is equivalent to an effect when the first wider portion 11 is arranged on a side of the inner space B and the second wider portion 12 is arranged on a side of the atmospheric space A. Accordingly, a worker handling the gasket 1 does not need to pay attention to an orientation of the gasket 1.

However, the gasket 1 does not need to be completely mirror-symmetric with respect to the plane perpendicular to the center axis Ax. For example, the second narrower portion 15 and the first narrower portion 14 may have dimensions and shapes similar to each other, and the second wider portion 12 and the first wider portion 11 may have dimensions and shapes similar to each other. In this case, an effect when the first wider portion 11 is arranged on a side of the atmospheric space A and the second wider portion 12 is arranged on a side of the inner space B is substantially equivalent to an effect when the first wider portion 11 is arranged on a side of the inner space B and the second wider portion 12 is arranged on a side of the atmospheric space A.

FIG. 4 illustrates the gasket 1 in a used state where the gasket 1 is arranged between the outer member 3 and the inner member 4. FIG. 4 depicts the outer member 3 and the inner member 4 by in the imaginary lines, and depicts an outline of the same gasket 1 as that in FIG. 3 in the unused (uncompressed) state by the solid line. FIG. 4 illustrates a shape of the gasket 1 in a section including the center axis Ax. An outline of the gasket 1 compressed between the outer member 3 and the inner member 4 is depicted by the imaginary line.

The first larger-diameter outer peripheral surface 11A in the first wider portion 11 is in surface contact with the inner peripheral surface 3A of the hole in the outer member 3. At a room temperature (e.g., 20° C.), a diameter D1 of the first larger-diameter outer peripheral surface 11A in the uncompressed state is equal to a diameter d1 of the inner peripheral surface 3A of the hole. Accordingly, an interference In1 of the first larger-diameter outer peripheral surface 11A with respect to the inner peripheral surface 3A of the hole is 0 mm.

The first smaller-diameter inner peripheral surface 11B in the first wider portion 11 is in surface contact with the outer peripheral surface 4C of the inner member 4. At the room temperature, a diameter D2 of the first smaller-diameter inner peripheral surface 11B in the uncompressed state is equal to a diameter d2 of the outer peripheral surface 4C of the inner member 4. Accordingly, an interference In2 of the first smaller-diameter inner peripheral surface 11B with respect to the outer peripheral surface 4C of the inner member 4 is 0 mm.

The second larger-diameter outer peripheral surface 12A in the second wider portion 12 is in surface contact with the inner peripheral surface 3A of the hole in the outer member 3. At the room temperature, the diameter D1 of the second larger-diameter outer peripheral surface 12A in the uncompressed state is equal to the diameter d1 of the inner peripheral surface 3A of the hole. Accordingly, the interference In1 of the second larger-diameter outer peripheral surface 12A with respect to the inner peripheral surface 3A of the hole is 0 mm.

The second smaller-diameter inner peripheral surface 12B in the second wider portion 12 is in surface contact with the outer peripheral surface 4C of the inner member 4. At the room temperature, the diameter D2 of the second smaller-diameter inner peripheral surface 12B in the uncompressed state is equal to the diameter d2 of the outer peripheral surface 4C of the inner member 4. Accordingly, the interference In2 of the second smaller-diameter inner peripheral surface 12B with respect to the outer peripheral surface 4C of the inner member 4 is 0 mm.

Thus, arranging the gasket 1 between the outer member 3 and the inner member 4 causes the dimensions of the first wider portion 11 and the second wider portion 12 to hardly change.

The outer corners 11C and 12C of the first wider portion 11 and the second wider portion 12 and the inner corners 11D and 12D of the first wider portion 11 and the second wider portion 12 in the uncompressed state each have a curvature radius R equal to or smaller than 0.5 mm. Since the interferences In1 and In2 are each 0 mm, the curvature radius R of the gasket 1 in a compressed state is substantially the same as the curvature radius R in the uncompressed state.

The third larger-diameter outer peripheral surface 13A in the third wider portion 13 is in surface contact with the inner peripheral surface 3A of the hole in the outer member 3. A diameter of the third larger-diameter outer peripheral surface 13A in the uncompressed state is larger than the diameter D1. The maximum diameter D3 of the third larger-diameter outer peripheral surface 13A is larger than each of the diameter D1 and the diameter d1. Preferably, an interference In3, i.e., (D3−d1)/2, of the third larger-diameter outer peripheral surface 13A with respect to the inner peripheral surface 3A of the hole is equal to or larger than 0.05 mm. Accordingly, the third larger-diameter outer peripheral surface 13A has a higher ability to block advancement of water than those of the first larger-diameter outer peripheral surface 11A and the second larger-diameter outer peripheral surface 12A.

The third smaller-diameter inner peripheral surface 13B is in surface contact with the outer peripheral surface 4C of the inner member 4. A diameter of the third smaller-diameter inner peripheral surface 13B in the uncompressed state is smaller than the diameter D2. The minimum diameter D4 of the third smaller-diameter inner peripheral surface 13B is smaller than each of the diameter D2 and the diameter d2. Preferably, an interference In4, i.e., (d2−D4)/2, of the third smaller-diameter inner peripheral surface 13B with respect to the outer peripheral surface 4C of the inner member 4 is equal to or larger than 0.05 mm. Accordingly, the third smaller-diameter inner peripheral surface 13B has a higher ability to block advancement of water than those of the first smaller-diameter inner peripheral surface 11B and the second smaller-diameter inner peripheral surface 12B.

Arranging the gasket 1 between the outer member 3 and the inner member 4 causes the dimensions of the first wider portion 11 and the second wider portion 12 to hardly change. Meanwhile, the third larger-diameter outer peripheral surface 13A is compressed by the inner peripheral surface 3A of the hole in the outer member 3. Thereby, the third larger-diameter outer peripheral surface 13A is deformed into a shape that conforms to the inner peripheral surface 3A of the hole, as illustrated by the imaginary line. As a result, a diameter of the third larger-diameter outer peripheral surface 13A is decreased to be d1 of the inner peripheral surface 3A of the hole. The third smaller-diameter inner peripheral surface 13B is compressed by the outer peripheral surface 4C of the inner member 4. Thereby, the third smaller-diameter inner peripheral surface 13B is deformed into a shape that conforms to the outer peripheral surface 4C, as illustrated by the imaginary line. As a result, a diameter of the third smaller-diameter inner peripheral surface 13B is increased to be the diameter d2 of the outer peripheral surface 4C of the inner member 4.

When the gasket 1 is arranged between the outer member 3 and the inner member 4, the first smaller-diameter outer peripheral surface 14A in the first narrower portion 14 does not contact with the inner peripheral surface 3A of the hole in the outer member 3. The first larger-diameter inner peripheral surface 14B does not contact with the outer peripheral surface 4C of the inner member 4. However, the deformation of the third larger-diameter outer peripheral surface 13A is accompanied by deformation of the first smaller-diameter outer peripheral surface 14A and the first outer peripheral groove 14C, as illustrated by the imaginary line. The deformation of the third smaller-diameter inner peripheral surface 13B is accompanied by deformation of the first larger-diameter inner peripheral surface 14B and the first inner peripheral groove 14D.

When the gasket 1 is arranged between the outer member 3 and the inner member 4, the maximum distance e1 between the first outer peripheral groove 14C (the imaginary line after the deformation) in the compressed state and the inner peripheral surface 3A of the hole is preferably equal to or larger than 0.05 mm. The maximum distance e2 between the first inner peripheral groove 14D (the imaginary line after the deformation) in the compressed state and the outer peripheral surface 4C of the inner member 4 is preferably equal to or larger than 0.05 mm.

When the gasket 1 is arranged between the outer member 3 and the inner member 4, the second smaller-diameter outer peripheral surface 15A in the second narrower portion 15 does not contact with the inner peripheral surface 3A of the hole in the outer member 3. The second larger-diameter inner peripheral surface 15B does not contact with the outer peripheral surface 4C of the inner member 4. However, the deformation of the third larger-diameter outer peripheral surface 13A is accompanied by deformation of the second smaller-diameter outer peripheral surface 15A and the second outer peripheral groove 15C, as illustrated by the imaginary line. The deformation of the third smaller-diameter inner peripheral surface 13B is accompanied by deformation of the second larger-diameter inner peripheral surface 15B and the second inner peripheral groove 15D.

When the gasket 1 is arranged between the outer member 3 and the inner member 4, the maximum distance e1 between the second outer peripheral groove 15C (the imaginary line after the deformation) in the compressed state and the inner peripheral surface 3A of the hole is preferably equal to or larger than 0.05 mm. The maximum distance e2 between the second inner peripheral groove 15D (the imaginary line after the deformation) in the compressed state and the outer peripheral surface 4C of the inner member 4 is preferably equal to or larger than 0.05 mm.

The maximum distances e1 and e2 are each preferably equal to or larger than 0.05 mm even when the gasket 1, the outer member 3, and the inner member 4 are thermally expanded.

In the axial direction of the gasket 1, a length L1 of a cylindrical part of the first larger-diameter outer peripheral surface 11A, a length L2 of a cylindrical part of the first smaller-diameter inner peripheral surface 11B, the length L1 of a cylindrical part of the second larger-diameter outer peripheral surface 12A, and the length L2 of a cylindrical part of the second smaller-diameter inner peripheral surface 12B are each larger than each of a length L3 of a cylindrical part of the third larger-diameter outer peripheral surface 13A and a length L4 of a cylindrical part of the third smaller-diameter inner peripheral surface 13B. Accordingly, in the axial direction of the gasket 1, this can secure the large length L1 over which the first larger-diameter outer peripheral surface 11A contacts with the inner peripheral surface 3A of the hole, the large length L2 over which the first smaller-diameter inner peripheral surface 11B contacts with the outer peripheral surface 4C of the inner member 4, the large length L1 over which the second larger-diameter outer peripheral surface 12A contacts with the inner peripheral surface 3A of the hole, and the large length L2 over which the second smaller-diameter inner peripheral surface 12B contacts with the outer peripheral surface 4C of the inner member 4. The lengths L1 and L2 are each preferably equal to or larger than 0.1 mm.

Figure 5:
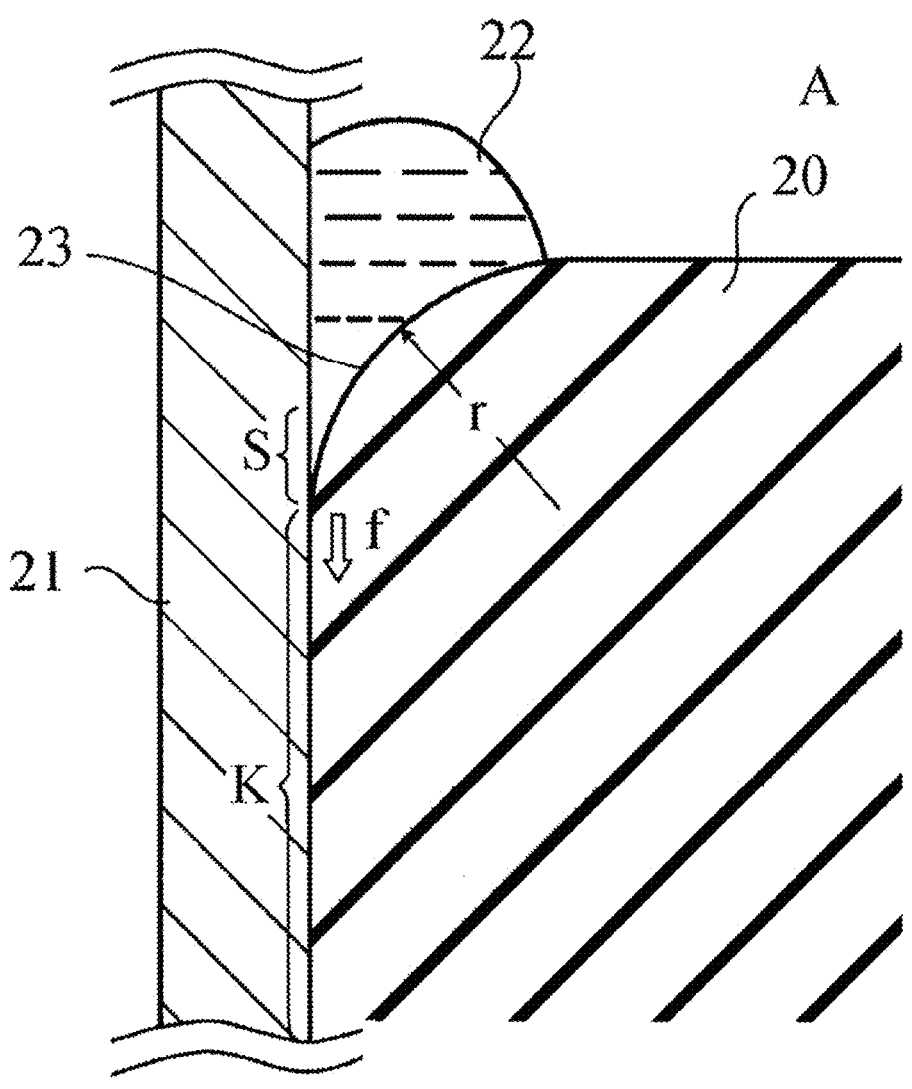
FIG. 5 schematically illustrates water intrusion into a gap between a general gasket and a member.

FIG. 5 schematically illustrates water intrusion into a gap between a general gasket 20 and a member 21. It is assumed that a water drop 22 in the atmospheric space A adheres to a corner 23 of the gasket 20. This results in that the water becomes likely to intrude into the minute gap (not illustrated) at an interface K between the member 21 and the gasket 20. The arrow f in the drawing indicates an advance direction of the water. The water slowly advances through the minute gap at the interface K due to capillary action. The water remaining at the interface K for a long time accelerates progress of corrosion of the member 21 at the interface K.

Even when an amount of the remaining water is small, corrosion of the member 21 progresses. When an amount of the remaining water is small, corrosion of the member 21 progresses more than in a case of a large amount of water.

Here, when a curvature radius r of the corner 23 is large, the intrusion of water into the gap is considered to be hastened. This is because the large curvature radius r enables a large water drop to easily adhere to the corner 23, and increases a length of an acute angled part S. The acute angled part S is located between the corner 23 and the member 21, and becomes a start portion of the intrusion to the interface K.

As illustrated in FIG. 4, it is assumed that water comes to the gasket 1 from the atmospheric space A as indicated by the arrow F in a state where the first wider portion 11 is arranged on a side of the atmospheric space A and the second wider portion 12 is arranged on a side of the inner space B. In FIG. 4, the atmospheric space A is on an upper side, and the inner space B is on a lower side. However, a relative position between the spaces A and B is not limited to that illustrated in the drawing. For example, the atmospheric space A and the inner space B may be arranged in the horizontal direction.

The water reaches the first wider portion 11 from the atmospheric space A. However, the curvature radius R of each of the outer corner 11C and the inner corner 11D of the first wider portion 11 is small, i.e., equal to or smaller than 0.5 mm. Thus, the water is suppressed from intruding from the atmospheric space A into a gap (a gap between the inner peripheral surface 3A of the hole and the first larger-diameter outer peripheral surface 11A) between the outer member 3 and the first wider portion 11, and is suppressed from intruding from the atmospheric space A into a gap (a gap between the outer peripheral surface 4C of the inner member 4 and the first smaller-diameter inner peripheral surface 11B) between the inner member 4 and the first wider portion 11. Thereby, corrosion of the outer member 3 and the inner member 4 is suppressed. When the curvature radius R is larger than 0.5 mm, more water intrudes into a gap between the inner peripheral surface 3A of the hole and the first larger-diameter outer peripheral surface 11A, and intrudes into a gap between the outer peripheral surface 4C and the first smaller-diameter inner peripheral surface 11B.

The first outer groove 14C is large for even a case where the water intrudes from the atmospheric space A through the gap between the outer member 3 and the first wider portion 11 into a space between the first smaller-diameter outer peripheral surface 14A and the inner peripheral surface 3A of the hole. In other words, the maximum distance e1 between the first outer groove 14C and the inner peripheral surface 3A of the hole is equal to or larger than 0.05 mm. For this reason, corrosion of the outer member 3 is suppressed. This is because even when the water remains while contacting with the inner peripheral surface 3A of the hole, a somewhat large amount of the water results in the suppression of the corrosion on the contrary.

The first inner peripheral groove 14D is large for even a case where the water intrudes from the atmospheric space A through the gap between the inner member 4 and the first wider portion 11 into a space between the first larger-diameter inner peripheral surface 14B and the outer peripheral surface 4C of the inner member 4. In other words, the maximum distance e2 between the first inner peripheral groove 14D and the outer peripheral surface 4C of the inner member 4 is equal to or larger than 0.05 mm. For this reason, corrosion of the inner member 4 is suppressed. This is because even when the water remains while contacting the outer peripheral surface 4C of the inner member 4, a somewhat large amount of the water results in the suppression of the corrosion on the contrary.

When the distances e1 and e2 are each smaller than 0.05 mm, an amount of the remaining water is small, and thus, the corrosion is likely to progress.

The length L1 over which the first larger-diameter outer peripheral surface 11A contacts with the inner peripheral surface 3A of the hole is sufficiently large, i.e., equal to or larger than 0.1 mm. For this reason, a shape of the first outer peripheral groove 14C between the first larger-diameter outer peripheral surface 11A and the third larger-diameter outer peripheral surface 13A is stable. Thus, the maximum distance e1 is secured. The length L2 over which the first smaller-diameter inner peripheral surface 11B contacts with the outer peripheral surface 4C of the inner member 4 is sufficiently large, i.e., equal to or larger than 0.1 mm. For this reason, a shape of the first inner peripheral groove 14D between the first smaller-diameter inner peripheral surface 11B and the third smaller-diameter inner peripheral surface 13B is stable. Thus, the maximum distance e2 is secured.

When the lengths L1 and L2 are each smaller than 0.1 mm, the first outer peripheral groove 14C and the first inner peripheral groove 14D are significantly deformed, and thus, the maximum distances e1 and e2 each become smaller than 0.05 mm.

Further, the interference In3 of the third larger-diameter outer peripheral surface 13A with respect to the inner peripheral surface 3A of the hole is sufficiently large, i.e., 0.05 mm for even a case where the water intrudes into the space between the first smaller-diameter outer peripheral surface 14A and the inner peripheral surface 3A of the hole. This makes it difficult for the water to intrude into the space between the second smaller-diameter outer peripheral surface 15A and the inner peripheral surface 3A of the hole through a gap between the third larger-diameter outer peripheral surface 13A and the inner peripheral surface 3A of the hole.

The interference In4 of the third smaller-diameter inner peripheral surface 13B with respect to the outer peripheral surface 4C is sufficiently large, i.e., 0.05 mm for even a case where the water intrudes into the space between the first larger-diameter inner peripheral surface 14B and the outer peripheral surface 4C of the inner member 4. This makes it difficult for the water to intrude into the space between the second larger-diameter inner peripheral surface 15B and the outer peripheral surface 4C of the inner member 4 through a gap between the third smaller-diameter inner peripheral surface 13B and the outer peripheral surface 4C of the inner member 4.

For this reason, corrosion of the outer member 3 and the inner member 4 can be suppressed, and thus, lives of the outer member 3 and the inner member 4 can be extended.

The second narrower portion 15 has the shape and dimension that are the same as or similar to those of the first narrower portion 14. The second wider portion 12 has the shape and dimension that are the same as or similar to those of the first wider portion 11. For this reason, the above-described effects can be achieved even when the first wider portion 11 is arranged on a side of the inner space B and the second wider portion 12 is arranged on a side of the atmospheric space A.

The sectional width of the gasket 1, i.e., (D3−D4)/2 that is a difference between the maximum outer radius D3/2 and the minimum inner radius D4/2 of the gasket 1 is, but not limited to, preferably a value within a range from 1 mm to 4 mm. The diameter d1 of the inner peripheral surface 3A of the hole in the outer member 3 is, but not limited to, preferably a value within a range from approximately 10 mm to approximately 40 mm. The diameter d2 of the outer peripheral surface 4C of the inner member 4 is, but not limited to, preferably a value within a range from approximately 8 mm to approximately 38 mm. An axial-direction length T of the gasket 1 is, but not limited to, preferably a value within a range from 2 mm to 5 mm.

The inventors experimented to confirm the effect achieved by the gasket 1 according to the embodiment. This effect is one of suppressing corrosion of the outer member 3 and the inner member 4. In the experiment, the diameter d1 of the inner peripheral surface 3A of the hole in the outer member 3 is 18.98 mm. The diameter d2 of the outer peripheral surface 4C of the inner member 4 is 15.18 mm.

The axial-direction length T of the gasket 1 is 3.5 mm. The outer corner 11C and the inner corner 11D of the first wider portion 11 in the uncompressed state each have the curvature radius R of 0.2 mm. The contact lengths L1 and L2 of the first wider portion 11 and the third wider portion 13 are each 1.1 mm. The maximum diameter D3 of the third larger-diameter outer peripheral surface 13A is 19.6 mm. The minimum diameter D4 of the third smaller-diameter inner peripheral surface 13B is 14.8 mm. A difference between the maximum outer radius D3/2 and the minimum inner radius D4/2 of the gasket 1 is 2.4 mm.

The diameter D1 of each of the first larger-diameter outer peripheral surface 11A and the second larger-diameter outer peripheral surface 12A is equal to the diameter d1 of the inner peripheral surface 3A of the hole, and is 18.98 mm. The diameter D2 of each of the second larger-diameter outer peripheral surface 12A and the second smaller-diameter inner peripheral surface 12B is equal to the diameter d2 of the outer peripheral surface 4C of the inner member 4, and is 15.18 mm.

Accordingly, when the gasket 1 is arranged between the outer member 3 and the inner member 4, an inner diameter expansion rate (d2−D4)/D4 is 0.026, and a radial-direction compression rate {(D3−D4)−(d1−d2)}/(D3−D4) of the gasket 1 is 0.21.

Figure 6:
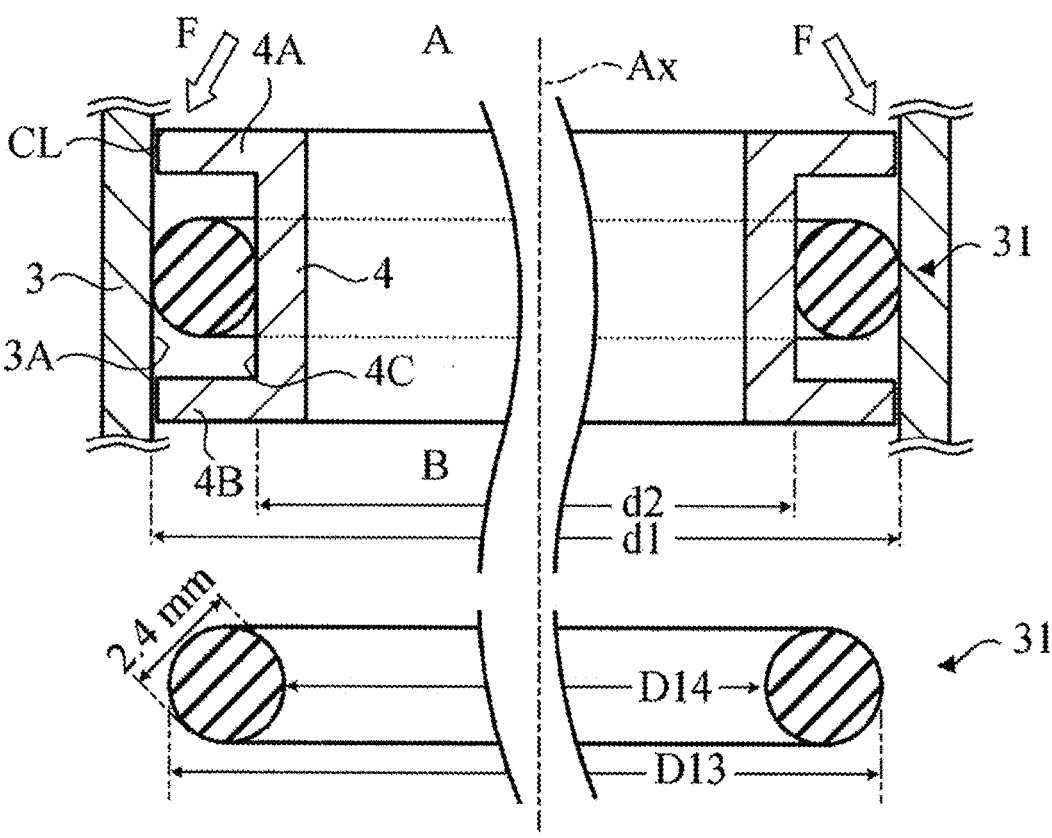
FIG. 6 is a sectional view of a sealing structure including a gasket of a comparative example 1.

A gasket 31 illustrated in FIG. 6 was prepared as a comparative example 1. The gasket 31 is an O-ring. The gasket 31 in an uncompressed state is illustrated on a lower side in FIG. 6. The gasket 31 in the uncompressed state has an outer diameter D13 of 19.6 mm and an inner diameter D14 of 14.8 mm. The gasket 31 in the uncompressed state has a section (circle) having a diameter of 2.4 mm and made by a plane including the center axis Ax.

Accordingly, when the gasket 31 is arranged between the outer member 3 and the inner member 4, an inner diameter expansion rate (d2−D14)/D14 is 0.026, and a radial-direction compression rate {(D13−D14)−(d1−d2)}/(D13−D14) of the gasket 31 is 0.21.

Figure 7:
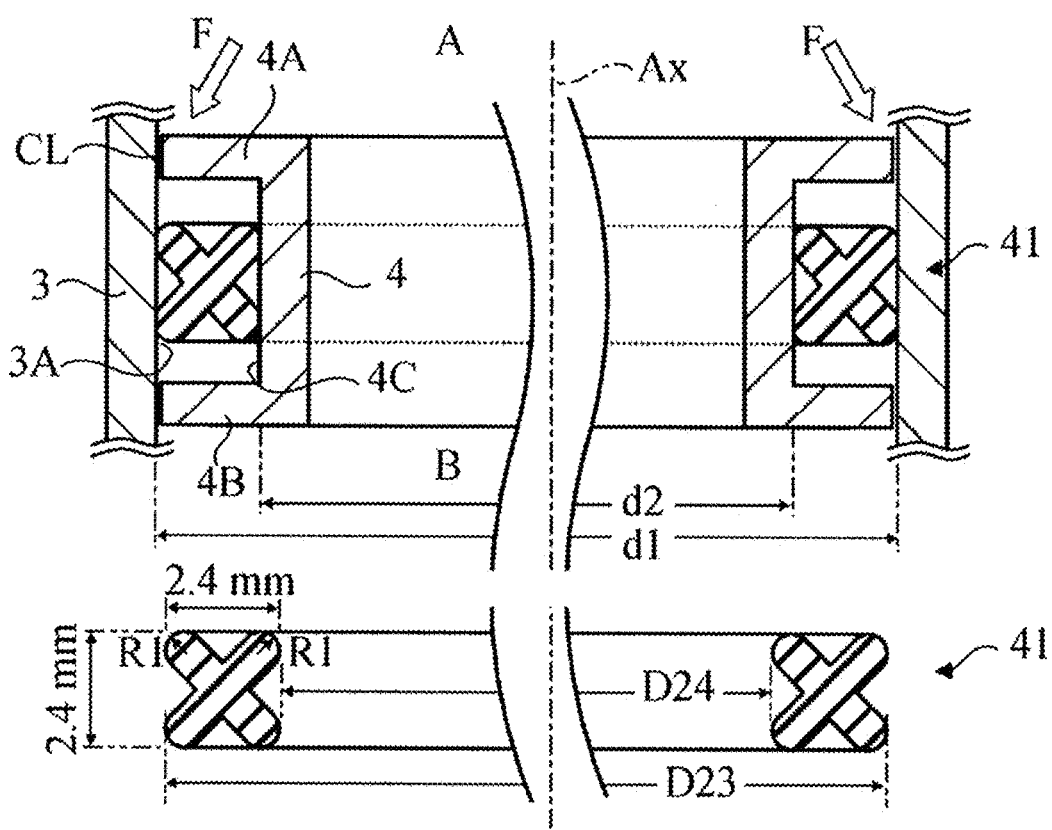
FIG. 7 is a sectional view of a sealing structure including a gasket of a comparative example 2.

A gasket 41 illustrated in FIG. 7 was prepared as a comparative example 2. The gasket 41 is an X-ring. The gasket 41 in an uncompressed state is illustrated on a lower side in FIG. 7. The gasket 41 in the uncompressed state includes corners each having a curvature radius R1 of 0.4 mm. The gasket 41 in the uncompressed state has the maximum outer diameter D23 of 19.6 mm and the minimum inner diameter D24 of 14.8 mm. The gasket 41 in the uncompressed state has a width of 2.4 mm in a section (X-shape) including the center axis Ax. The gasket 41 in the uncompressed state has a height of 2.4 mm.

Accordingly, when the gasket 41 is arranged between the outer member 3 and the inner member 4, an inner diameter expansion rate $(d2-D24)/D24$ is 0.026, and a radial-direction compression rate $\{(D23-D24)-(d1-d2)\}/(D23-D24)$ of the gasket 41 is 0.21.

In the experiment, salt water was sprayed by a small sprinkler to be supplied from the atmospheric space A toward each of the gaskets 1, 31, and 41 in used states through an annular gap CL between the inner peripheral surface 3A of the hole in the outer member 3 and the larger-diameter portion 4A of the inner member 4. A width of the gap CL (a distance between the inner peripheral surface 3A and the larger-diameter portion 4A) is 0.075 mm.

In the experiment, after the salt water was supplied, the members 3 and 4 and the gaskets 1, 31, and 41 were dried, further humidified by a humidifier, dried again, and then exposed to the atmosphere. The outer member 3 and the inner member 4 in states of being exposed to the atmosphere were visually inspected for confirming whether the outer member 3 and the inner member 4 are corroded at predetermined locations.

The predetermined locations in the gasket 1 according to the embodiment are a part included in the inner peripheral surface 3A of the hole in the outer member 3 and facing the second smaller-diameter outer peripheral surface 15A, and a part included in the outer peripheral surface 4C of the inner member 4 and facing the second larger-diameter inner peripheral surface 15B. The predetermined locations in the gasket 31 of the comparative example 1 are a part included in the inner peripheral surface 3A of the hole in the outer member 3 and shifted from the gasket 31 toward the inner space B, and a part included in the outer peripheral surface 4C of the inner member 4 and shifted from the gasket 31 toward the inner space B. The predetermined locations in the gasket 41 of the comparative example 2 are a part included in the inner peripheral surface 3A of the hole in the outer member 3 and shifted from the gasket 41 toward the inner space B, and a part included in the outer peripheral surface 4C of the inner member 4 and shifted from the gasket 41 toward the inner space B.

In the experiment, a cycle of the supplying of the salt water, the drying, the humidifying, the drying, and the exposing to the atmosphere was repeated. The number of the cycles until the outer member 3 and the inner member 4 were corroded at the predetermined locations was measured. A duration of the one cycle is 24 hours.

Figure 8:
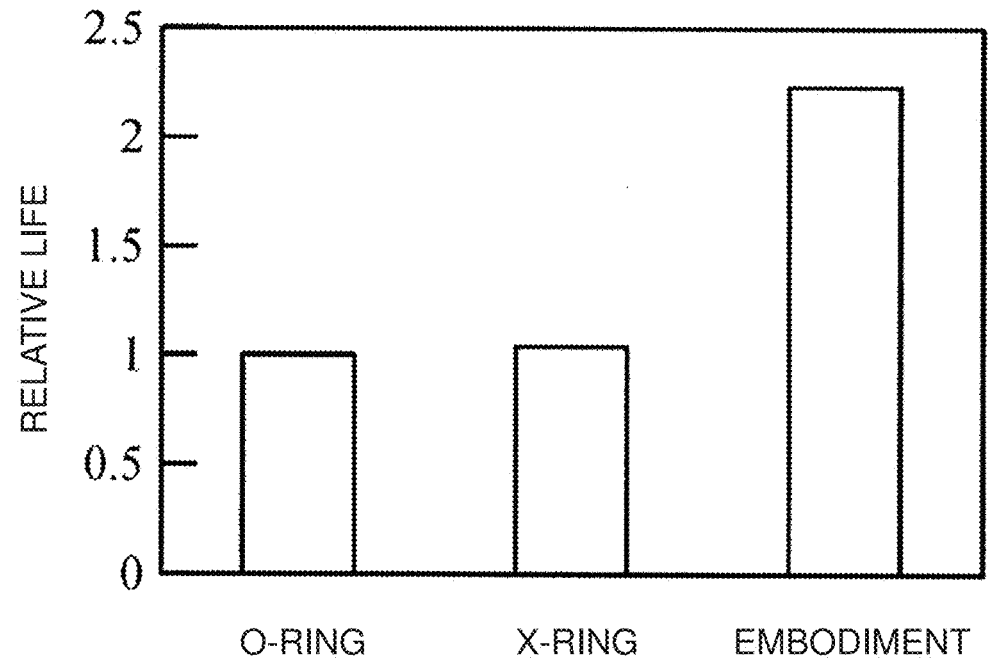
FIG. 8 is a graph representing relative lives of the gaskets of the embodiment and the comparative examples 1 and 2.

FIG. 8 illustrates the experiment results. A relative life in the vertical axis in FIG. 8 indicates the number of the cycles for the corrosion occurrence at the predetermined locations in the cases of using the respective gaskets. The relative life is indicated on the assumption that the number of the cycles for the corrosion occurrence at the predetermined locations in the case of using the gasket 31 as the O-ring is 1.0. As apparent from FIG. 8, a life of the gasket 31 as the O-ring and a life of the gasket 41 as the X-ring are approximately the same. In contrast to this, a life of the gasket 1 according to the embodiment is longer than twice the life of each of the gaskets 31 and 41 of the comparative examples 1 and 2.

As described above, the present embodiment can suppress corrosion of the outer member 3 and the inner member 4, and can extend lives of the outer member 3 and the inner member 4.

The present embodiment can suppress corrosion of the outer member 3 and the inner member 4, and can extend lives of the outer member 3 and the inner member 4, even when the curvature radius R is smaller than 0.5 mm, the maximum distances e1 and e2 are each smaller than 0.05 mm, the contact lengths L1 and L2 are each smaller than 0.1 mm, and the interferences In3 and In4 are each smaller than 0.05 mm.

In the present embodiment, in a case where the first wider portion 11 is arranged on a side of the atmospheric space A and the second wider portion 12 is arranged on a side of the inner space B, the outer member 3 is suppressed from being corroded even when water intrudes from the atmospheric space A into the space between the first smaller-diameter outer peripheral surface 14A and the inner peripheral surface 3A of the hole through the gap between the outer member 3 and the first larger-diameter outer peripheral surface 11A. This is because the first outer peripheral groove 14C is formed on the first smaller-diameter outer peripheral surface 14A.

The inner member 4 is suppressed from being corroded even when water intrudes from the atmospheric space A into the space between the first larger-diameter inner peripheral surface 14B and the outer peripheral surface 4C of the inner member 4 through the gap between the inner member 4 and the first smaller-diameter inner peripheral surface 11B. This is because the first inner peripheral groove 14D is formed on the first larger-diameter inner peripheral surface 14B.

A somewhat larger length of the cylindrical part of the first larger-diameter outer peripheral surface 11A increases the length L1 over which the first larger-diameter outer peripheral surface 11A contacts with the inner peripheral surface 3A of the hole. Thus, a shape of the first outer peripheral groove 14C between the first larger-diameter outer peripheral surface 11A and the third larger-diameter outer peripheral surface 13A becomes stable.

A somewhat larger length of the cylindrical part of the first smaller-diameter inner peripheral surface 11B increases the length L2 over which the first smaller-diameter inner peripheral surface 11B contacts with the outer peripheral surface 4C. Thus, a shape of the first inner peripheral groove 14D between the first smaller-diameter inner peripheral surface 11B and the third smaller-diameter inner peripheral surface 13B becomes stable.

The maximum diameter D3 of the third larger-diameter outer peripheral surface 13A is larger than the diameter D1 of each of the first larger-diameter outer peripheral surface 11A and the second larger-diameter outer peripheral surface 12A, for even a case where water intrudes into the space between the first smaller-diameter outer peripheral surface 14A and the inner peripheral surface 3A of the hole. Thus, the interference In3 of the third larger-diameter outer peripheral surface 13A with respect to the inner peripheral surface 3A of the hole is large. This makes it difficult for the water to intrude into the space between the second smaller-diameter outer peripheral surface 15A and the inner peripheral surface 3A of the hole through the gap between the third larger-diameter outer peripheral surface 13A and the inner peripheral surface 3A of the hole.

The minimum diameter D4 of the third smaller-diameter inner peripheral surface 13B is smaller than the diameter D2 of each of the first smaller-diameter inner peripheral surface 11B and the second smaller-diameter inner peripheral surface 12B, for even a case where water intrudes into the space between the first larger-diameter inner peripheral surface 14B and the outer peripheral surface 4C of the inner member 4. Thus, the interference In4 of the third smaller-diameter inner peripheral surface 13B with respect to the outer peripheral surface 4C is large. This makes it difficult for the water to intrudes into the space between the second larger-diameter inner peripheral surface 15B and the outer peripheral surface 4C through the gap between the third smaller-diameter inner peripheral surface 13B and the outer peripheral surface 4C.

Thus, the outer member 3 and the inner member 4 can be suppressed from being corroded, and lives of the outer member 3 and the inner member 4 can be extended.

The second narrower portion 15 has a shape that is the same as or similar to that of the first narrower portion 14. The second wider portion 12 has a shape that is the same as or similar to that of the first wider portion 11. Thus, the above-described effects can be achieved even when the first wider portion 11 is arranged on a side of the inner space B and the second wider portion 12 is arranged on a side of the atmospheric space A.

In the embodiment, the diameter D1 of each of the first larger-diameter outer peripheral surface 11A and the second larger-diameter outer peripheral surface 12A in the uncompressed state is equal to the diameter d1 of the inner peripheral surface 3A of the hole in the outer member 3. Accordingly, the interference In1 of the first larger-diameter outer peripheral surface 11A with respect to the inner peripheral surface 3A of the hole and the interference In1 of the second larger-diameter outer peripheral surface 12A with respect to the inner peripheral surface 3A of the hole are each 0 mm.

The diameter D2 of each of the first smaller-diameter inner peripheral surface 11B and the second smaller-diameter inner peripheral surface 12B in the uncompressed state is equal to the diameter d2 of the outer peripheral surface 4C of the inner member 4. Accordingly, the interference In2 of the first smaller-diameter inner peripheral surface 11B with respect to the outer peripheral surface 4C and the interference In2 of the second smaller-diameter inner peripheral surface 12B with respect to the outer peripheral surface 4C are each 0 mm.

Thus, the gasket 1 can be easily arranged between the inner peripheral surface 3A of the hole and the outer peripheral surface 4C of the inner member 4. Particularly, at the time of arranging the gasket 1 between the inner peripheral surface 3A of the hole in the outer member 3 and the outer peripheral surface 4C of the inner member 4, the first wider portion 11 and the second wider portion 12 are unlikely to deform in each of the axial direction and the radial direction, even when friction force acts in the axial direction of the gasket 1. Accordingly, a sealing ability of the gasket 1 is unlikely to be impaired.

Figure 9:
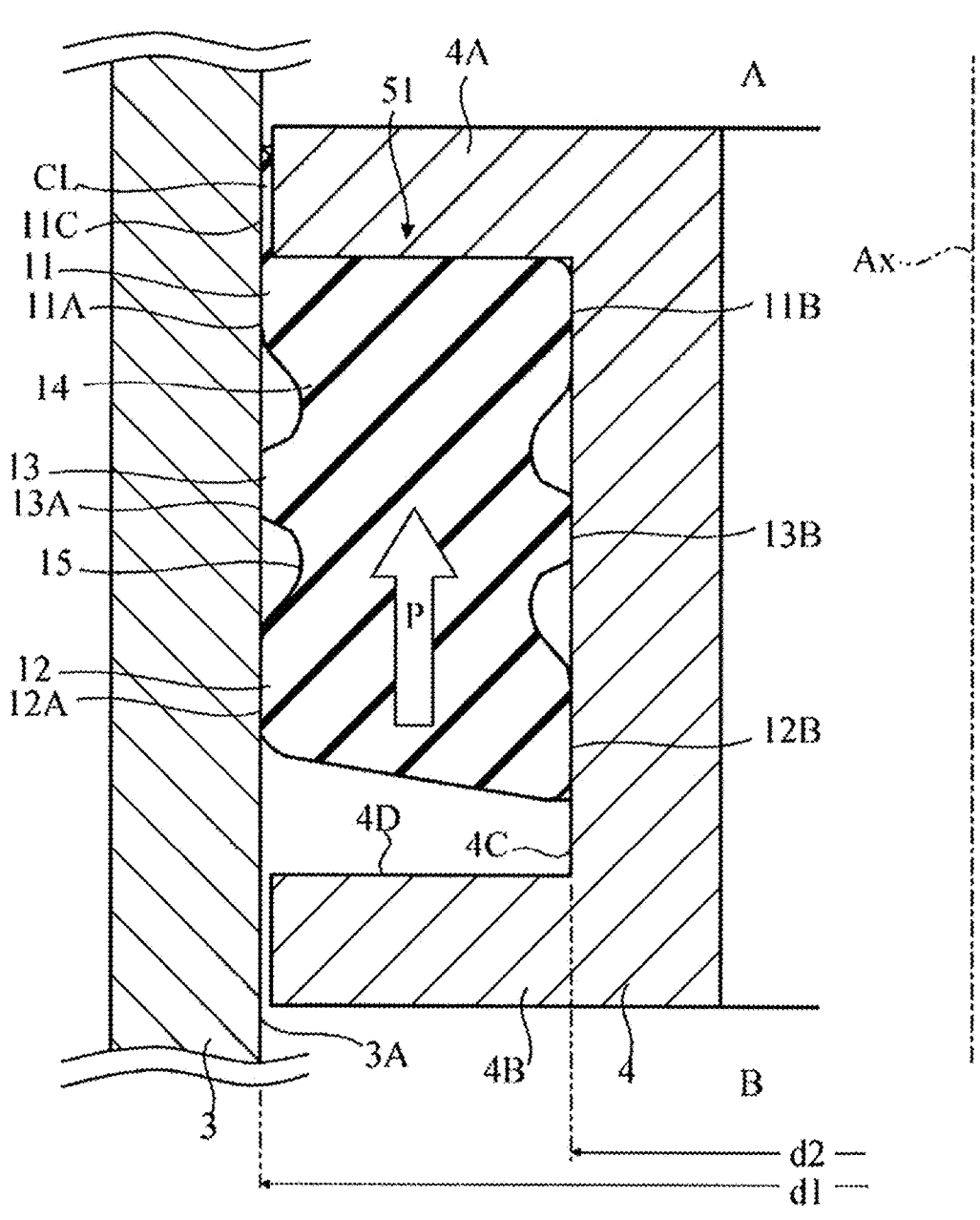
FIG. 9 illustrates a defect at the time of arranging a gasket of a comparative example 3 between the outer member and the inner member.

FIG. 9 illustrates a defect at the time of arranging a gasket 51 of a comparative example 3 between the outer member 3 and the inner member 4. In the gasket 51, a diameter of each of the first larger-diameter outer peripheral surface 11A and the second larger-diameter outer peripheral surface 12A in an uncompressed state is larger than the diameter d1 of the inner peripheral surface 3A of the hole in the outer member 3. For this reason, an interference of the first larger-diameter outer peripheral surface 11A with respect to the inner peripheral surface 3A of the hole and an interference of the second larger-diameter outer peripheral surface 12A with respect to the inner peripheral surface 3A of the hole are each larger than 0 mm. A diameter of each of the first smaller-diameter inner peripheral surface 11B and the second smaller-diameter inner peripheral surface 12B in the uncompressed state is smaller than the diameter d2 of the outer peripheral surface 4C of the inner member 4. Thus, an interference of the first smaller-diameter inner peripheral surface 11B with respect to the outer peripheral surface 4C and an interference of the second smaller-diameter inner peripheral surface 12B with respect to the outer peripheral surface 4C are each larger than 0 mm.

At the time of arranging the gasket 51 between the outer member 3 and the inner member 4, the gasket 51 is slid along the center axis Ax relative to the inner peripheral surface 3A of the hole in the outer member 3 while being made to contact with the outer peripheral surface 4C of the inner member 4, as indicated by the arrow P. In this case, large friction force acts on the first larger-diameter outer peripheral surface 11A and the second larger-diameter outer peripheral surface 12A due to the inner peripheral surface 3A of the hole in the outer member 3. Further, large friction force acts on the first smaller-diameter inner peripheral surface 11B and the second smaller-diameter inner peripheral surface 12B due to the outer peripheral surface 4C of the inner member 4. Thus, the first wider portion 11 and the second wider portion 12 are significantly deformed in the axial direction. In addition, the entire gasket 51 including the third wider portion 13 is also significantly deformed in the axial direction. Thereby, a diameter of the third larger-diameter outer peripheral surface 13A is decreased, and a diameter of the third smaller-diameter inner peripheral surface 13B is increased. Thus, an interference of the third larger-diameter outer peripheral surface 13A with respect to the inner peripheral surface 3A of the hole in the outer member 3 is decreased. Further, an interference of the third smaller-diameter inner peripheral surface 13B with respect to the outer peripheral surface 4C is decreased. Accordingly, a sealing ability of the gasket 51 is impaired.

When the outer corner 11C is caught in the annular gap CL between the inner peripheral surface 3A of the hole in the outer member 3 and the larger-diameter portion 4A of the inner member 4, unexpected stress can be generated in an inside of the gasket 51. Thereby, the gasket 51 is pulled toward the atmospheric space A and outward in the radial direction. Thus, a sealing ability of the gasket 51 is impaired.

In contrast to this, the gasket 1 according to the embodiment can prevent these problems.

Figure 10:
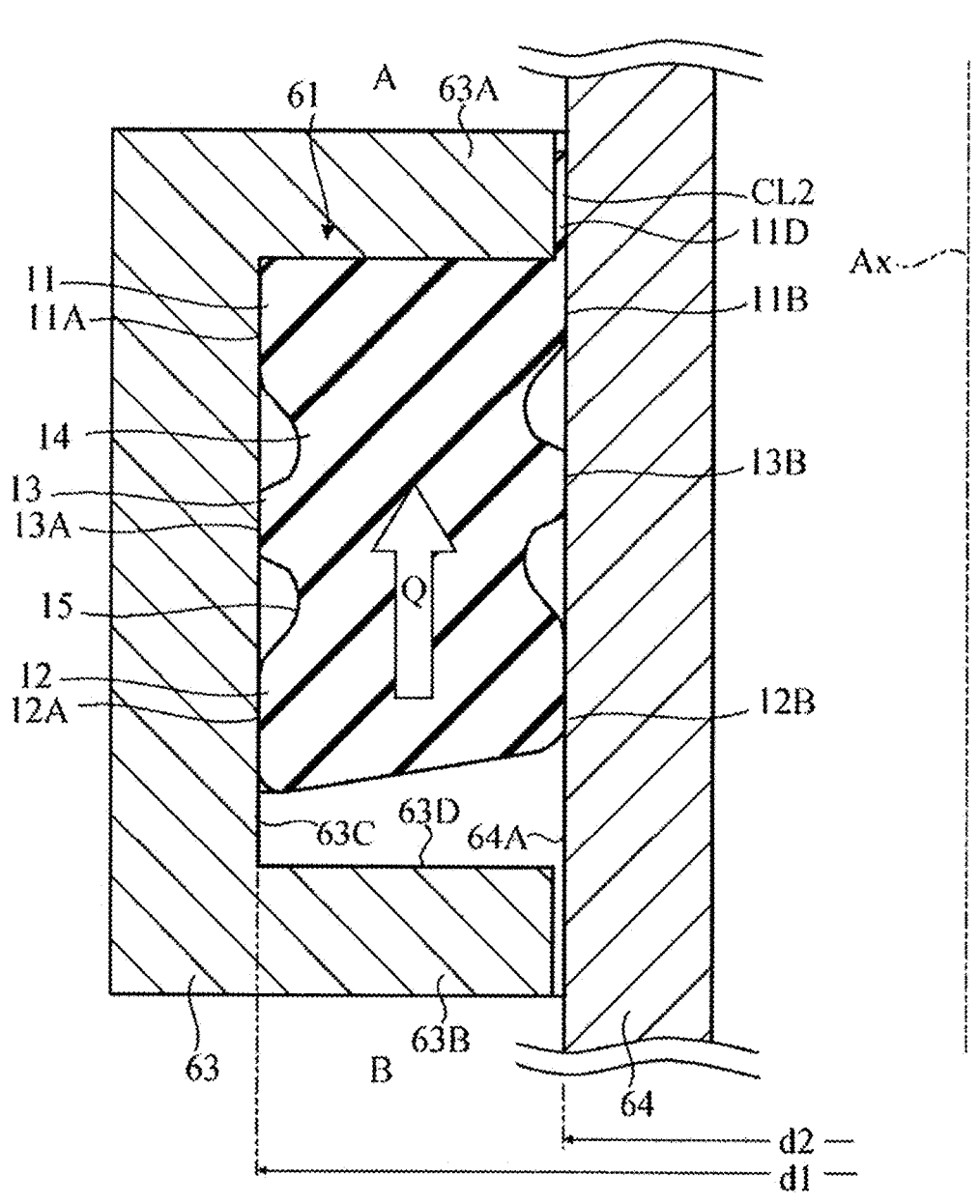
FIG. 10 illustrates a defect at the time of arranging a gasket of a comparative example 4 between an outer member and an inner member.

The gasket 1 according to the embodiment may be arranged between an outer member 63 and an inner member 64 illustrated in FIG. 10 in such a way as to contact with an inner peripheral surface 63C of a hole in the outer member 63 and an outer peripheral surface 64A of the inner member 64 and thereby shut off an inner space B of the outer member 63 from the atmospheric space A. The outer member 63 is, for example, a housing for a machine or structure. The inner member 64 is a tube, for example. The outer member 63 and the inner member 64 are each formed of metal (e.g., aluminum). The outer member 63 includes a larger-diameter portion 63A on a side of the atmospheric space A, and includes a larger-diameter portion 63B on a side of the inner space B. The gasket 1 is arranged in an inner peripheral groove 63D between the larger-diameter portions 63A and 63B.

The larger-diameter portions 63A and 63B may be flanges.

FIG. 10 illustrates a defect at the time of arranging a gasket 61 of a comparative example 4 between the outer member 63 and the inner member 64. In the gasket 61, a diameter of each of the first larger-diameter outer peripheral surface 11A and the second larger-diameter outer peripheral surface 12A in an uncompressed state is larger than the diameter d1 of the inner peripheral surface 63C of the hole in the outer member 63. Thus, an interference of the first larger-diameter outer peripheral surface 11A with respect to the inner peripheral surface 63C of the hole and an interference of the second larger-diameter outer peripheral surface 12A with respect to the inner peripheral surface 63C of the hole are each larger than 0 mm. A diameter of each of the first smaller-diameter inner peripheral surface 11B and the second smaller-diameter inner peripheral surface 12B in the uncompressed state is smaller than the diameter d2 of the outer peripheral surface 64A of the inner member 64. Thus, an interference of the first smaller-diameter inner peripheral surface 11B with respect to the outer peripheral surface 64A of the inner member 64 and an interference of the second smaller-diameter inner peripheral surface 12B with respect to the outer peripheral surface 64A of the inner member 64 are each larger than 0 mm.

At the time of arranging the gasket 61 between the outer member 63 and the inner member 64, the gasket 61 is slid along the center axis Ax relative to the inner peripheral surface 63C of the hole in the outer member 63 while being made to contact with the inner peripheral surface 63C of the hole in the outer member 63, as indicated by the arrow Q. In this case, large friction force acts on the first larger-diameter outer peripheral surface 11A and the second larger-diameter outer peripheral surface 12A due to the inner peripheral surface 63C of the hole in the outer member 63. Further, large friction force acts on the first smaller-diameter inner peripheral surface 11B and the second smaller-diameter inner peripheral surface 12B due to the outer peripheral surface 64A of the inner member 64. Thus, the first wider portion 11 and the second wider portion 12 are significantly deformed in the axial direction. In addition, the entire gasket 61 including the third wider portion 13 is also significantly deformed in the axial direction. Thereby, a diameter of the third larger-diameter outer peripheral surface 13A is decreased, and a diameter of the third smaller-diameter inner peripheral surface 13B is increased. Thus, an interference of the third larger-diameter outer peripheral surface 13A with respect to the inner peripheral surface 63C of the hole in the outer member 63 is decreased. Further, an interference of the third smaller-diameter inner peripheral surface 13B with respect to the outer peripheral surface 64A of the inner member 64 is decreased. Accordingly, a sealing ability of the gasket 61 is impaired.

When the inner corner 11D is caught in an annular gap CL2 between the larger-diameter portion 63A of the outer member 63 and the outer peripheral surface 64A of the inner member 64, unexpected stress can be generated in an inside of the gasket 61. Thereby, the gasket 61 is pulled toward the atmospheric space A and inward in the radial direction. Thus, a sealing ability of the gasket 61 is impaired.

In contrast to this, the gasket 1 according to the embodiment can prevent these problems.

In the embodiment, when the gasket 1 is not compressed between the outer member 3 and the inner member 4, the third larger-diameter outer peripheral surface 13A has a semicircular shape protruding outward in the radial direction, in the section including the axis of the gasket 1, as illustrated in FIG. 3 and FIG. 4. The third smaller-diameter inner peripheral surface 13B has a semicircular shape protruding inward in the radial direction, in the section including the axis of the gasket 1.

Thus, at the time of arranging the gasket 1 between the inner peripheral surface 3A of the hole in the outer member 3 and the outer peripheral surface 4C of the inner member 4, a deformed amount of the third wider portion 13 due to friction can be minimized even when the gasket 1 is slid against the outer member 3 or the inner member 4.

Although the preferred embodiment of the present disclosure is illustrated and described above, it will be understood by those skilled in the art that forms and details can be modified without departing from the scope of the invention described in claims. Such modifications, changes, and alterations are intended to fall within the scope of the present disclosure.

Figure 11:
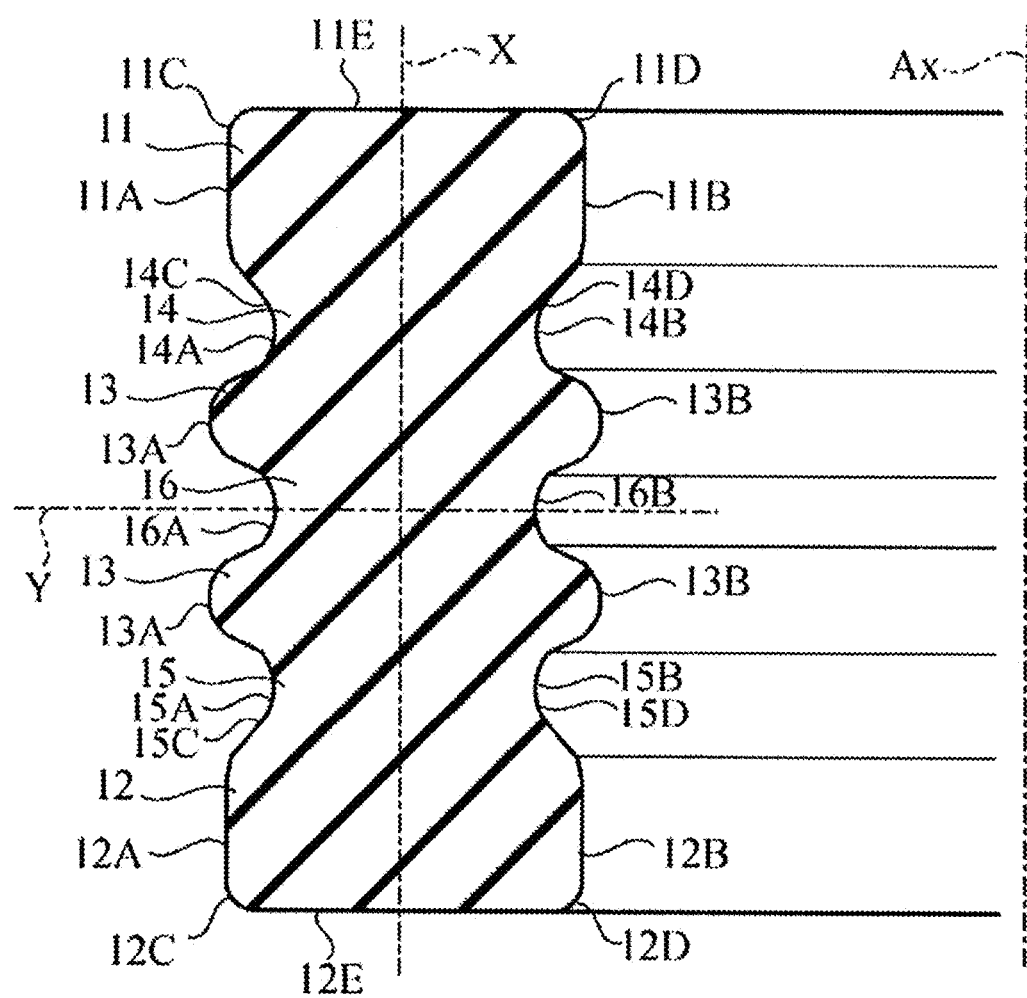
FIG. 11 is an enlarged sectional view of a gasket according to a modified example 1.

For example, the gasket 1 includes the single third wider portion 13 in the above-described embodiment, but may include a plurality of the third wider portions 13 as in a modified example 1 illustrated in FIG. 11. A third narrower portion 16 is provided between the two third wider portions 13 adjacent to each other. The third narrower portion 16 includes a third smaller-diameter outer peripheral surface 16A and a third larger-diameter inner peripheral surface 16B. The third smaller-diameter outer peripheral surface 16A includes an outer peripheral groove. The third larger-diameter inner peripheral surface 16B includes an inner peripheral groove. The outer peripheral groove of the third smaller-diameter outer peripheral surface 16A has a substantially semicircular shape concave inward in the radial direction, in a section including the center axis Ax of the gasket 1. The outer peripheral groove of the third smaller-diameter outer peripheral surface 16A smoothly connects the two mutually adjacent third larger-diameter outer peripheral surfaces 13A to each other. The inner peripheral groove of the third larger-diameter inner peripheral surface 16B has a substantially semicircular shape concave outward in the radial direction, in the section including the center axis Ax of the gasket 1. The inner peripheral groove of the third larger-diameter inner peripheral surface 16B smoothly connects, to each other, the third smaller-diameter inner peripheral surfaces 13B of the two mutually adjacent third wider portions 13.

Figure 12:
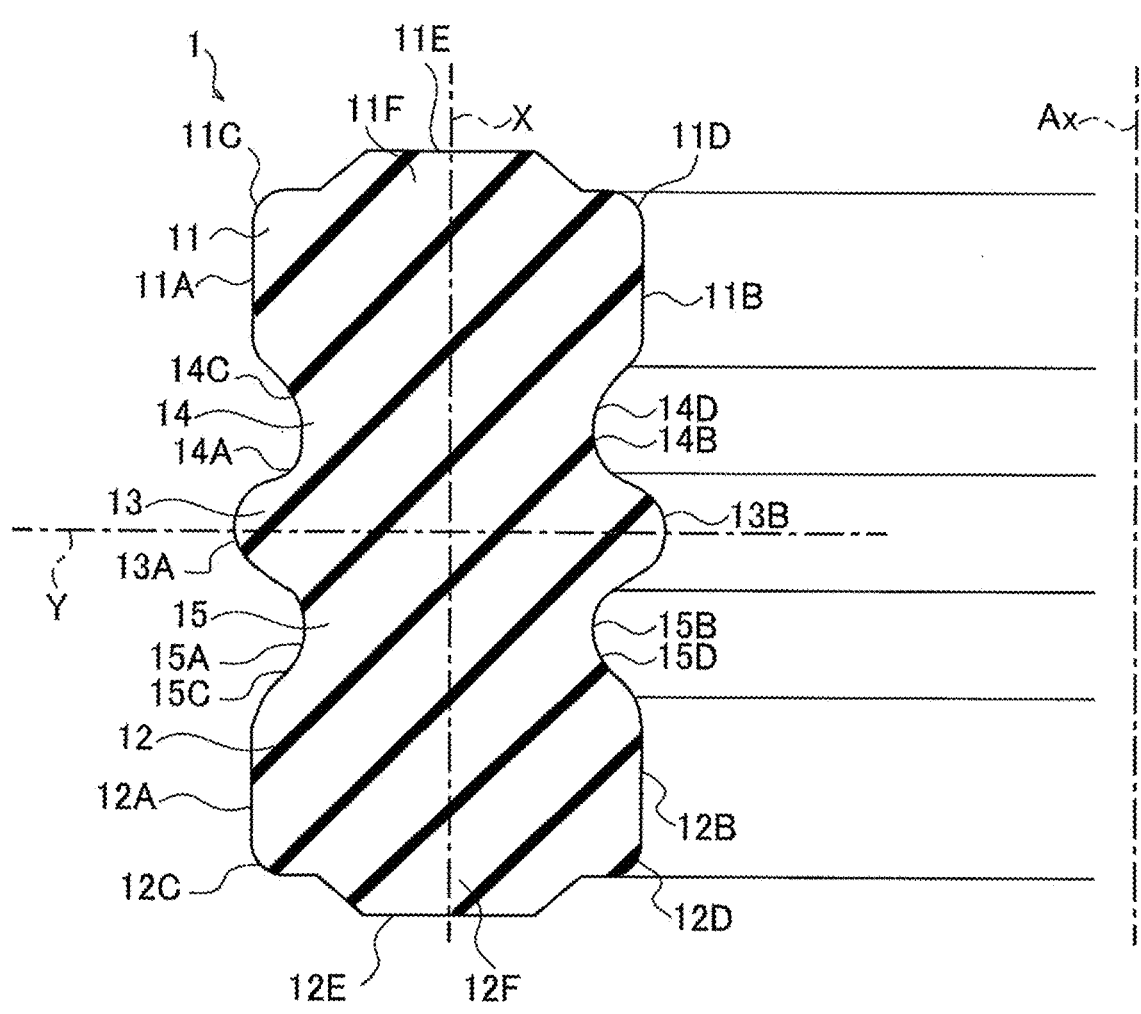
FIG. 12 is an enlarged sectional view of a gasket according to a modified example 2.

As in a modified example 2 illustrated in FIG. 12, the first end surface 11E may include a first protrusion 11F, and the second end surface 12E may include a second protrusion 12F. Thereby, at the time of arranging the gasket 1 between the outer member 3 and the inner member 4, the outer corner 11C can be suppressed from being caught in the annular gap CL between the inner peripheral surface 3A of the hole in the outer member 3 and the larger-diameter portion 4A of the inner member 4 when the gasket 1 is slid along the center axis Ax against the inner peripheral surface 3A of the hole in the outer member 3 while being made to contact with the outer peripheral surface 4C of the inner member 4. Further, the first protrusion 11F and the second end surface 12E are unlikely to expand in a direction of separating from the vertical axis X of the section, in a state where the gasket 1 is made to contact with the outer peripheral surface 4C of the inner member 4. Thus, the first protrusion 11F and the second end surface 12E are suppressed from being deformed, a surface pressure of the gasket 1 is maintained, and the sealing performance is improved.

The invention claimed is:
1. A sealing structure, comprising:
an outer member having a hole;
an inner member; and
an annular gasket made of elastomer and contacting with
    an inner peripheral surface of the hole in the outer
    member and an outer peripheral surface of the inner
    member to shut off an inner space of the outer member
    from an atmospheric space, the gasket including:
a first wider portion including
    a first larger-diameter outer peripheral surface having a
        cylindrical shape and contacting with the inner
        peripheral surface of the hole over a length equal to
        or larger than 0.1 mm in an axial direction of the
        gasket, a first smaller-diameter inner peripheral surface having a cylindrical shape and contacting with the outer peripheral surface of the inner member over a length equal to or larger than 0.1 mm in the axial direction of the gasket, a first end surface, a first outer corner formed by the first larger-diameter outer peripheral surface and the first end surface and having a curvature radius equal to or smaller than 0.5 mm in a section including an axis of the gasket, and a first inner corner formed by the first smaller-diameter inner peripheral surface and the first end surface and having a curvature radius equal to or smaller than 0.5 mm in the section including the axis of the gasket;

a second wider portion including a second larger-diameter outer peripheral surface having a cylindrical shape and contacting with the inner peripheral surface of the hole over a length equal to or larger than 0.1 mm in the axial direction of the gasket, a second smaller-diameter inner peripheral surface having a cylindrical shape and contacting with the outer peripheral surface of the inner member over a length equal to or larger than 0.1 mm in the axial direction of the gasket, a second end surface, a second outer corner formed by the second larger-diameter outer peripheral surface and the second end surface and having a curvature radius equal to or smaller than 0.5 mm in the section including the axis of the gasket, and a second inner corner formed by the second smaller-diameter inner peripheral surface and the second end surface and having a curvature radius equal to or smaller than 0.5 mm in the section including the axis of the gasket;

a third wider portion including a third larger-diameter outer peripheral surface contacting with the inner peripheral surface of the hole and having radial interference equal to or larger than 0.05 mm with respect to the inner peripheral surface of the hole, and a third smaller-diameter inner peripheral surface contacting with the outer peripheral surface of the inner member and having radial interference equal to or larger than 0.05 mm with respect to the outer peripheral surface of the inner member;

a first narrower portion provided between the first wider portion and the third wider portion, the first narrower portion including a first smaller-diameter outer peripheral surface spaced from the inner peripheral surface of the hole and including a first outer peripheral groove, and a first larger-diameter inner peripheral surface spaced from the outer peripheral surface of the inner member and having a first inner peripheral groove; and a second narrower portion provided between the second wider portion and the third wider portion, the second narrower portion including a second smaller-diameter outer peripheral surface spaced from the inner peripheral surface of the hole and including a second outer peripheral groove, and a second larger-diameter inner peripheral surface spaced from the outer peripheral surface of the inner member and including a second inner peripheral groove, wherein a maximum distance between the first outer peripheral groove and the inner peripheral surface of the hole, a maximum distance between the second outer peripheral groove and the inner peripheral surface of the hole, a maximum distance between the first inner peripheral groove and the outer peripheral surface of the inner member, and a maximum distance between the second inner peripheral groove and the outer peripheral surface of the inner member are each equal to or larger than 0.05 mm in a state where the gasket is compressed between the outer member and the inner member, a diameter of each of the first larger-diameter outer peripheral surface and the second larger-diameter outer peripheral surface Is equal to a diameter of the Inner peripheral surface of the hole, in an uncompressed state of the gasket, a diameter of each of the first smaller-diameter inner peripheral surface and the second smaller-diameter inner peripheral surface is equal to a diameter of the outer peripheral surface of the inner member, in the uncompressed state.

2. A sealing structure, comprising:

an outer member having a hole;

an inner member; and an annular gasket made of elastomer and contacting with an inner peripheral surface of the hole in the outer member and an outer peripheral surface of the inner member to shut off an inner space of the outer member from an atmospheric space, the gasket including:

a first wider portion including a first larger-diameter outer peripheral surface having a cylindrical shape, and a first smaller-diameter inner peripheral surface having a cylindrical shape;

a second wider portion including a second larger-diameter outer peripheral surface having a cylindrical shape, and a second smaller-diameter inner peripheral surface having a cylindrical shape;

a third wider portion including a third larger-diameter outer peripheral surface that has a diameter larger than a diameter of each of the first larger-diameter outer peripheral surface and the second larger-diameter outer peripheral surface when the gasket is not compressed between the outer member and the inner member, and a third smaller-diameter inner peripheral surface that has a diameter smaller than a diameter of each of the first smaller-diameter inner peripheral surface and the second smaller-diameter inner peripheral surface when the gasket is not compressed between the outer member and the inner member;

a first narrower portion provided between the first wider portion and the third wider portion, the first narrower portion including a first smaller-diameter outer peripheral surface including a first outer peripheral groove, and a first larger-diameter inner peripheral surface including a first inner peripheral groove;

a second narrower portion provided between the second wider portion and the third wider portion, the second narrower portion including a second smaller-diameter outer peripheral surface including a second outer peripheral groove, and a second larger-diameter inner peripheral surface including a second inner peripheral groove, wherein a length of a cylindrical part of the first larger-diameter outer peripheral surface, a length of a cylindrical part of the first smaller-diameter inner peripheral surface, a length of a cylindrical part of the second larger-diameter outer peripheral surface, and a length of a cylindrical part of the second smaller-diameter inner peripheral surface are each larger than each of a length of a cylindrical part of the third larger-diameter outer peripheral surface and a length of a cylindrical part of the third smaller-diameter inner peripheral surface, in an axial direction of the gasket, a diameter of each of the first larger-diameter outer peripheral surface and the second larger-diameter outer peripheral surface is equal to a diameter of the inner peripheral surface of the hole, in an uncompressed state of the gasket, a diameter of each of the first smaller-diameter inner peripheral surface and the second smaller-diameter inner peripheral surface is equal to a diameter of the outer peripheral surface of the inner member, in the uncompressed state.

3. The sealing structure according to claim 1, wherein, the third larger-diameter outer peripheral surface has a semicircular shape protruding outward in a radial direction, in a section including the axis of the gasket, in an uncompressed state of the gasket, the third smaller-diameter inner peripheral surface has a semicircular shape protruding inward in the radial direction, in the section, in the uncompressed state.

4. The sealing structure according to claim 1, wherein the gasket has shape mirror-symmetric with respect to a plane perpendicular to an axis of the gasket.

5. The sealing structure according to claim 1, wherein the first end surface includes a first protrusion, and the second end surface includes a second protrusion.

6. The sealing structure according to claim 1, wherein the first larger-diameter outer peripheral surface, the third larger-diameter outer peripheral surface, and the second larger-diameter outer peripheral surface contact with the inner peripheral surface of the hole, the first smaller-diameter inner peripheral surface, the third smaller-diameter inner peripheral surface, and the second smaller-diameter inner peripheral surface contact with the outer peripheral surface of the inner member, the first smaller-diameter outer peripheral surface and the second smaller-diameter outer peripheral surface do not contact with the inner peripheral surface of the hole, and the first larger-diameter inner peripheral surface and the second larger-diameter inner peripheral surface do not contact with the outer peripheral surface of the inner member.

7. The sealing structure according to claim 2, wherein, the third larger-diameter outer peripheral surface has a semicircular shape protruding outward in a radial direction, in a section including the axis of the gasket, in an uncompressed state of the gasket, the third smaller-diameter inner peripheral surface has a semicircular shape protruding inward in the radial direction, in the section, in the uncompressed state.

8. The sealing structure according to claim 3, wherein a diameter of each of the first larger-diameter outer peripheral surface and the second larger-diameter outer peripheral surface is equal to a diameter of the inner peripheral surface of the hole, in an uncompressed state of the gasket, a diameter of each of the first smaller-diameter inner peripheral surface and the second smaller-diameter inner peripheral surface is equal to a diameter of the outer peripheral surface of the inner member, in the uncompressed state.

9. The sealing structure according to claim 2, wherein the gasket has shape mirror-symmetric with respect to a plane perpendicular to an axis of the gasket.

10. The sealing structure according to claim 3, wherein the gasket has shape mirror-symmetric with respect to a plane perpendicular to an axis of the gasket.

11. The sealing structure according to claim 2, wherein the first end surface includes a first protrusion, and the second end surface includes a second protrusion.

12. The sealing structure according to claim 3, wherein the first end surface includes a first protrusion, and the second end surface includes a second protrusion.

13. The gasket according to claim 4, wherein the first end surface includes a first protrusion, and the second end surface includes a second protrusion.

* * * * *